(12) United States Patent
Murphy et al.

(10) Patent No.: US 8,478,571 B1
(45) Date of Patent: Jul. 2, 2013

(54) PLUG AND PLAY RECONFIGURABLE PROCESSOR BOARDS FOR USE WITH MISSION SPACECRAFT DESIGN TOOLS IN RAPIDLY DEVELOPABLE SPACECRAFT

(75) Inventors: Gerald B. Murphy, Conifer, CO (US); James L. Wolf, Conifer, CO (US); Ramon Krosley, Lakewood, CO (US)

(73) Assignee: Design_Net Engineering, LLC, Golden, CO (US)

( * ) Notice: Subject to any disclaimer, the term of this patent is extended or adjusted under 35 U.S.C. 154(b) by 288 days.

(21) Appl. No.: 12/848,060

(22) Filed: Jul. 30, 2010

Related U.S. Application Data

(60) Provisional application No. 61/213,930, filed on Jul. 30, 2009.

(51) Int. Cl.
*G06F 17/50* (2006.01)
(52) U.S. Cl.
USPC .................. 703/2; 703/5; 703/22; 244/159.3; 244/171.8; 701/2
(58) Field of Classification Search
USPC .............. 703/2, 5, 22, 242; 701/2; 244/159.3, 244/171.8
See application file for complete search history.

(56) References Cited

U.S. PATENT DOCUMENTS

| 5,931,418 | A | * | 8/1999 | Eller et al. | 244/171.8 |
| 5,979,833 | A | * | 11/1999 | Eller et al. | 244/159.4 |
| 2011/0042521 | A1 | * | 2/2011 | Sample | 244/159.3 |
| 2012/0065813 | A1 | * | 3/2012 | Nguyen et al. | 701/2 |

OTHER PUBLICATIONS

Caffrey, M. et al., On-Orbit Flight Results from the Reconfigurable Cibola Flight Experiment Satellite (CFESat), 2009 17th IEEE Symposium on Field Programmable Custom Computing Machines, 8 pages.
Conde, R.F. et al., Adaptive Instrument Module—A Reconfigurable Processor for Spacecraft Applications, 1999, pp. 1-5.

* cited by examiner

*Primary Examiner* — Thai Phan
(74) *Attorney, Agent, or Firm* — Lathrop & Gage LLP

(57) ABSTRACT

Systems and methods reduce development, integration and testing time of a spacecraft implemented with one or more reconfigurable processor boards. Mission spacecraft design tools design, configure, simulate and analyze the spacecraft based upon constraints of the mission requirements. The mission spacecraft design tools utilize a database of defined module specifications and firmware components. One or more RPBs are programmed based upon the configuration and interfaced to other end item components defined by the configuration to form the spacecraft.

2 Claims, 5 Drawing Sheets

PLUG AND PLAY RECONFIGURABLE PROCESSOR BOARDS FOR USE WITH MISSION SPACECRAFT DESIGN TOOLS IN RAPIDLY DEVELOPABLE SPACECRAFT

RELATED APPLICATIONS

This application claims priority to Provisional Application Ser. No. 61/213,930, filed Jul. 30, 2009, which is incorporated herein by reference.

GOVERNMENT RIGHTS STATEMENT

This invention was made with Government support under the following Contract Nos. FA9453-05-D-250 0001, awarded by the U.S. Air Force, FA9453-04-C-0317 awarded by the U.S. Air Force, FA9453-07-M-0131 awarded by the U.S. Air Force, FA9453-08-C-0075 awarded by the U.S. Air Force, and FA9453-09-C-0312 awarded by the U.S. Air Force. The Government has certain rights in the invention.

BACKGROUND

The current art in space mission design involves the effort of a team of expert human engineers. Each engineer concentrates on a subsystem in a spacecraft. For example, an engineer may have responsibility for the spacecraft structure, while another handles the design of the electrical power subsystem. All of the other subsystems have the attention of their respective engineers. Throughout the design process, information flows between engineers to keep their designs synchronized. For example, the power engineer tells the structural engineer the mass of the electrical components, such as the battery, so the structure can be designed to support them. The exchange of information can cause individual engineers to rework their design in order to adapt to new information. Eventually, over a period of days, weeks or months, the process stabilizes on a viable design, and that becomes the recommendation of the team. Testing and validation of the intermediate and final designs is done by high-fidelity simulation and analysis tools. Specific hardware, modeled in these tools, is chosen to implement the design and any changes require a lengthy evaluation process to determine impacts to the rest of the spacecraft.

From a flight hardware perspective, spacecraft avionics customarily rely on one or more dedicated special purpose processors that are designed and fabricated to handle specific subsets of the avionics workload present in a traditional spacecraft. These subsets are based upon customary spacecraft subsystems and include communication, data handling, power management, attitude determination and control, propulsion, and payload interfaces. Traditional spacecraft design dictates that all hardware, such as processor circuit boards specifically designed to support particular spacecraft subsystems, undergo a lengthy and costly design phase, fabrication, followed by customization and interface testing together with their associated subsystem software. This time consuming process is traditionally required to provide a reliable, although costly, custom subsystem solution for each different spacecraft.

SUMMARY OF THE INVENTION

Systems and methods reduce development, integration and testing time of a spacecraft implemented with one or more reconfigurable processor boards. Mission spacecraft design tools design, configure, simulate and analyze the spacecraft based upon constraints of the mission requirements. The mission spacecraft design tools utilize a database of defined module specifications and firmware components. One or more RPBs are programmed based upon the configuration and interfaced to other end item components defined by the configuration to form the spacecraft.

DETAILED DESCRIPTION OF THE DRAWINGS

Figure 4:
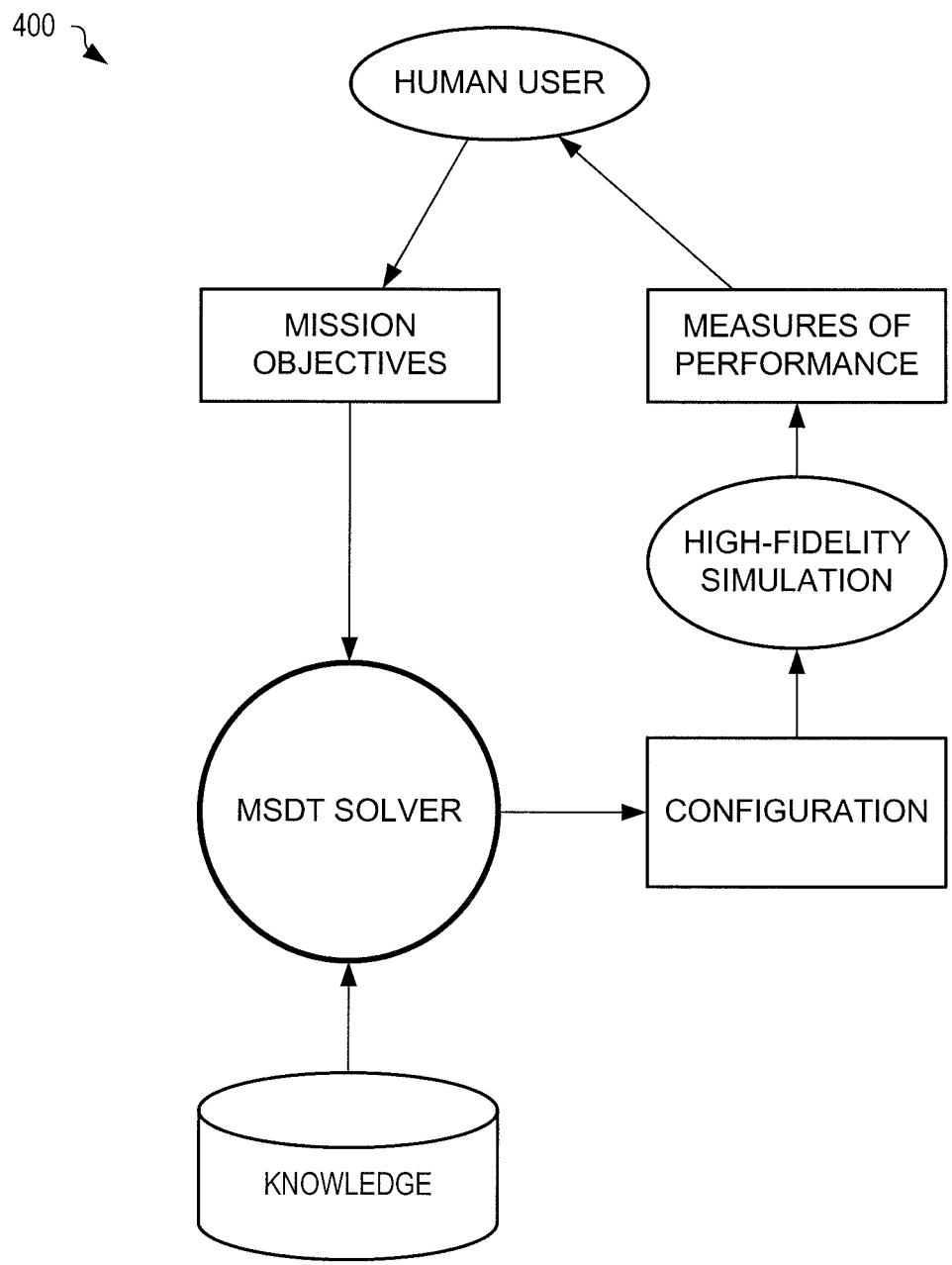
FIG. 4 shows the role of MSDT in orchestrating the rapid design process described in FIG. 3.

In a novel departure from the traditional time consuming process of developing individual spacecraft configuration solutions, as summarized above, the use of the Mission and Spacecraft Design Tool (MSDT) replaces the routine work of mission design teams with an algorithmic computation that is guided by knowledge provided by human engineers. After the engineers have provided a piece of knowledge, MSDT retains that knowledge, and may reuse it in computations for other missions. The operator of MSDT needs not be an engineer; instead, technicians may take advantage of knowledge stored in MSDT for well-understood missions. MSDT may compute a spacecraft design starting with a simple specification of mission objectives, such as the locations of regions of interest on Earth and mission operations to be performed. MSDT may compute a spacecraft design given that a particular payload is to be flown. Any partial configuration may serve as a starting point for computing a configuration. MSDT combines constraint solver technology with knowledge management technology to provide intelligent rapid spacecraft design. The innovative architecture, illustrated schematically in FIG. 4 significantly reduces the design time for a significant segment of the small spacecraft market. By reducing design time, use of MSDT in mission configurations will also lower the overall cost to develop a spacecraft for a mission.

The novelty of MSDT is not simply the combination of two synergetic technologies. The knowledge stored by MSDT has a number of forms, in order to support the various kinds of problems that must be solved in designing a spacecraft for a mission. One form is algebraic constraints, which can express relations like that between the ground resolution distance and the aperture of a camera on a spacecraft. Another form is a relational table that describes the collection of features that characterize an instrument for a spacecraft. A significant subset of the configuration of a spacecraft is the set of connections between components, which forms topological relationships. MSDT knowledge includes information about the connections that are possible between components, forming a power supply topology and a structural topology. The latter topology is based on additional knowledge that specifies the location and orientations of components relative to one another. MSDT contains yet another form of knowledge that enables it to select parts needed for a spacecraft, and to know when it has selected just enough parts, so it can know when to stop configuring the spacecraft. This last form of knowledge has the form of resources provided and consumed by components; MSDT links providers to consumers and chooses providers until it has satisfied all the resources needed by components. The choices of providers are limited by algebraic constraints, relational constraints, and topological constraints, and locally optimized to minimize a cost function, such as time for delivery of components.

The knowledge held by MSDT is applied through a novel algorithm that allows information to flow in any direction through a constraint. For a simple example, consider the algebraic constraint "a<b", where "a" is the latitude of a point of interest on Earth, and "b" is the inclination of the orbit. If a user of MSDT specifies a value for "a", then the set of possible values for "b" gets a lower bound as a result of the constraint. Conversely, if that user were to have specified a value for "b", then the set of possible values for "a" would get an upper bound. In other words, the information may flow from a specification in either direction through a constraint.

MSDT then generates a spacecraft configuration that satisfies the entered constraints. The resulting configuration can then be analyzed and existing constraints can be modified or removed and additional constraints can be added based on the results of the analysis. If two or more constraints conflict, no candidate configuration can be generated and the user is informed of the conflicting constraints. Constraints can take several forms including algebraic constraints which are used to capture formulas for modeling effects (e.g. atmospheric impacts on image resolution, agility of pointing, etc.) and relational constraints used to specify characteristics of components (e.g. Imager A can take images at a resolution of X). A single constraint specified by a user can result in derived constraints of both type. For example, if a user specifies a certain image resolution, derived constraints would limit both the available payloads based on a relational constraint and algebraic constraints such as the available orbit altitudes based on atmospheric limitations on resolution.

As an example of constraints, consider a photoimaging satellite. Such a satellite may be specified with constraints including frequency at which a particular location is to be imaged, and the minimum resolution of the image at a particular wavelength. An MSDT solution may include selection of a camera system from a satellite component library having at least that minimum resolution, an orbit—including inclination and altitude—that passes over the particular location at the desired rate, and a selection of an image processor from a library of processing functions. Other parameters may be defined in the satellite component library, such as physical dimensions and weight of the imaging system that may in turn be used as additional constraints on the satellite design.

When constraints conflict, the MSDT system will produce a warning, and may fail to produce a valid solution.

MSDT has the capability to convert its mission configuration into a body of machine readable specifications for high-fidelity simulation tools provided by independent vendors including six degrees of freedom (6DOF) simulations, thermal/structural/power modeling, and orbit modeling simulation tools, among others. MSDT may provide specifications for electronic simulation tools as well. These specifications include firmware for configuring one or more RPBs 110 both for simulation and pre-flight configuration of the satellite. The firmware is based in part upon the library of processing functions. In particular, MSDT provides machine readable inputs of parameters and constraints as needed by each simulation tool and in a format suitable for that tool. Each tool is provided with a subset of the parameters and constraints known to MSDT that are relevant to its simulation, for example a simulation of spacecraft attitude and maneuvering needs to know information such as vehicle mass, center of gravity, and desired imaging locations, but need not know the wavelength at which imaging is to occur. These tools may include, but are not limited to, orbital dynamics.

Figure 5:
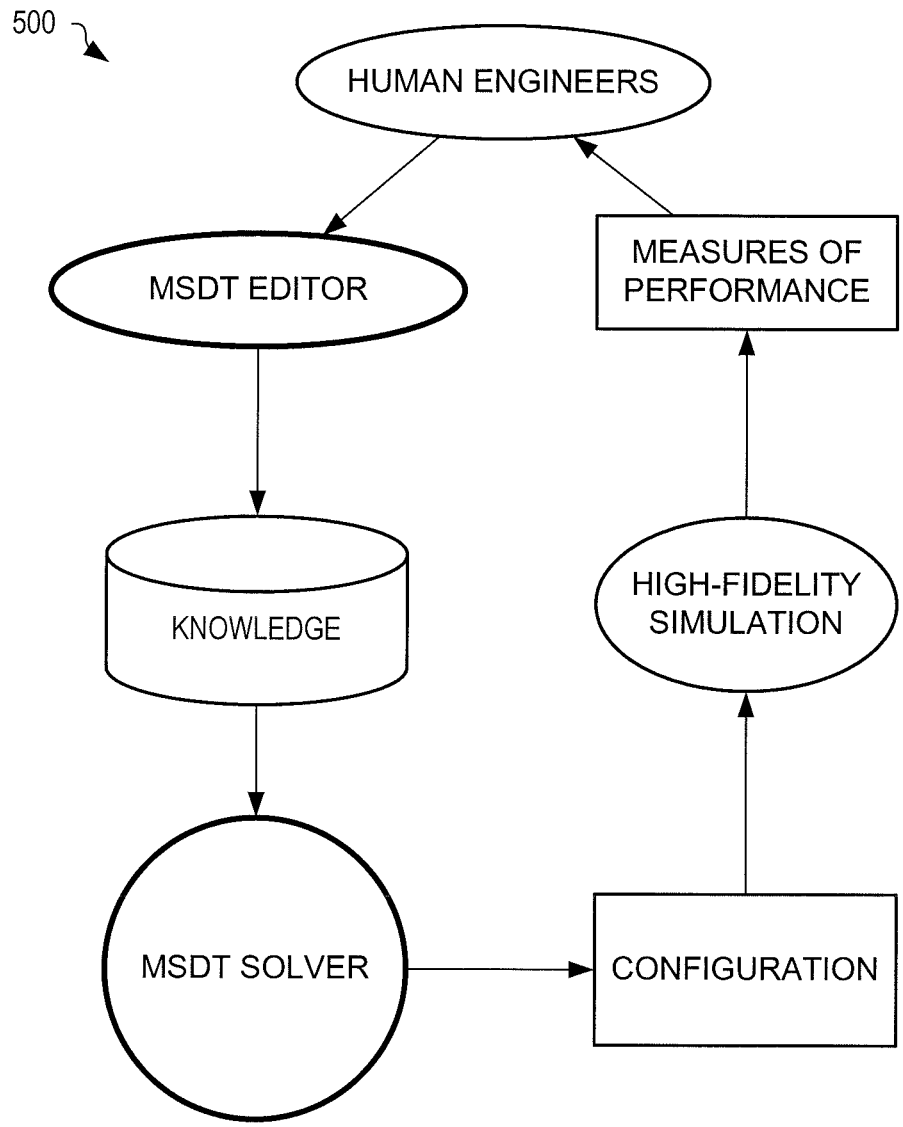
FIG. 5 shows the role of MSDT in gathering knowledge.

MSDT may invoke those simulation tools to simulate a scenario in the mission. Scenarios can range from simply monitoring the spacecraft through a specified number of orbits to full day-in-the-life activities including simulated ground station tasking and active use of the payload. After the simulation, MSDT collects measures of performance such as power usage, target visibility and others from the simulation tools. By comparing the measures of performance to the constrained values of variables, defined as constraints in the mission configuration, such as minimum target visibility, power consumption, and ground station visibility. An engineer may find a reason to refine the knowledge in MSDT that generated the mission configuration. That sequence of events (generate, simulate, measure, refine, repeat) forms a feedback loop that tests and improves the knowledge in MSDT, as illustrated in FIG. 5.

Use of a reconfigurable processor board (RPB) further reduces the design, development and integration time for a significant segment of the small spacecraft market. Besides reducing integration time, use of one or more RPBs in a spacecraft configuration also lowers the overall cost to develop the spacecraft. A suite of interactive software tools, orchestrated by MSDT is used to design and configure the spacecraft to incorporate an assembly of one or more RPBs configured to provide multi-component interfaces (for example, the interface between attitude determination components such as sun sensors and star trackers) and the spacecraft subsystem, as well as executive processors. Each of one or more RPBs within the spacecraft is made up of identical hardware. These RPBs communicate with each other in a standard networked architecture, as implemented in the first instantiation of RPBs for the Air Force Research Laboratory's PnPSat, as a modified Spacewire network, called Space Plug and Play Avionics (SPA). The RPB design provides flexibility afforded by several tiers of configurability. The core hardware elements are configured by modular software and firmware to meet the needs of a very wide range of typical and atypical spacecraft support functions, including Attitude Determination and Control, Payload Support, Communications, and Command and Data Handling.

Figure 1:
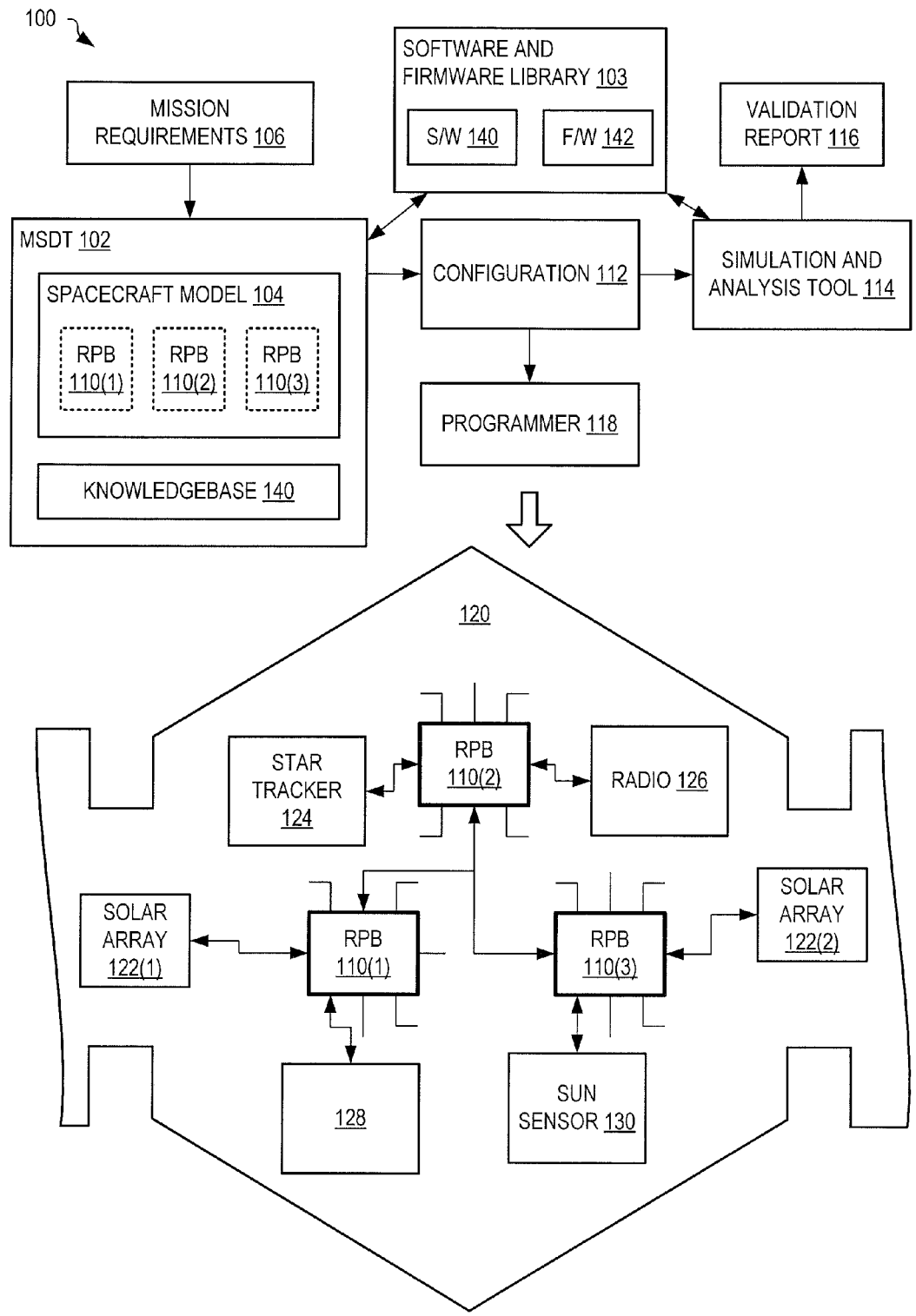
FIG. 1 shows one exemplary system for designing, simulating, evaluating and implementing a spacecraft using one or more plug-and-play reconfigurable processor boards (RPBs), in an embodiment.

FIG. 1 shows one exemplary system 100 for designing, simulating, evaluating and implementing a spacecraft 120 (e.g., a satellite) utilizing a MSDT 102 and one or more plug-and-play RPBs 110 for reducing fabrication, integration and testing time. RPB 110 is suitable for use in many different system applications and is not limited to spacecraft. RPBs 110 may be designed, fabricated, and tested well before their configuration and use. That is, the hardware portion of RPB 110 may be pre-tested and certified 'flight ready' prior to its actual need, thus allowing rapid deployment of RPB 110 within each specific application. Similarly, a software and firmware library 103 stores software modules 140 and filmware modules 142 that may be selected by MSDT 102 to configure each RPB 110 to provide the needed functionality and connectivity. These modules 140 and 142 are each fully tested for use with RPB 110, thereby reducing the need for new software/firmware to be written and reducing the time required for integration and testing thereof. For example, if one RPB is selected to utilize an RS232 interface, MSDT 102 will select associated firmware and software modules that configure the RS232 interface portions of the RPB and provide a software interface for the use thereof. Since these modules are previously tested for use with an RPB, integration and testing of those modules is minimized.

Software is critical to facilitating the process-oriented approach to meeting the Responsive Space objectives, of the Operationally Responsive Space Office (a joint initiative of several agencies within the United States Department of Defense—URL: http://www.kirtland.af.mil/library/factsheets/factsheet.asp?id=6881).

MSDT 102 allows a user to design spacecraft 120 based upon mission requirements 106. It allows a user to enter specific (possibly incomplete) mission requirements 106 as constraints and taking into account factors such as availability of components, payload specification, and launch sites/opportunities MSDT produces a candidate spacecraft configuration 112 that includes the hardware, software and firmware required to build and model the mission. The candidate configuration and then be modeled, as a satellite model 104, to demonstrate suitability of the design to meet the needs of a mission, expressed as high-level objectives within mission requirements 106, before any hardware is assembled. In the example of FIG. 1, satellite model 104 is shown modeling RPBs 110(1)-(3). More or fewer RPBs 110 may be used within satellite model 104 (and hence spacecraft 120) without departing from the scope hereof. For example, the number of RPBs 110 selected is based upon mission requirements 106, which may specify one or more of processing requirements, connectivity, and redundancy requirements of spacecraft 120.

Mission design tools 102 generate a configuration 112 (which may be represented as XML) that defines components, connectivity and functionality of spacecraft 120. A simulation and analysis tool 114 validates configuration 112 against mission requirements 106, and may generate a validation report 116, for example. Mission design tools 102 and simulation and analysis tool 114 utilize knowledge of RPB 110 and modules 140 and 142 of library 103 to model and simulate spacecraft 120. Simulation and analysis tool 114 may also generate operation scripts 115 that facilitate operation, integration and testing of spacecraft 120.

After use of simulation and analysis tool 114 to provide confidence that configuration 112 satisfies mission requirements 106, configuration 112 is used to define each of the one or more RPBs 110 included within spacecraft 120, each end item component that interfaces with these RPBs 110, and the required flight software load, consisting of software components that handle the routine operation of the spacecraft, including but not limited to attitude determination and control, thermal monitoring/control, momentum management, and power management, as well as mission-specific modules required to fulfill the spacecraft's mission. These routine operations include one or more of spacecraft maneuvering, thruster control, orientation control, temperature management, power management, communications with ground control stations, telemetry acquisition and encoding, software and firmware updating, mission-specific functions, and other functions. End item components 122-132 may represent one or more of: sun sensor, star tracker, communication radio, solar arrays, image capture and compression modules, GPS encoders, real-time clocks, vehicle temperature management units, maneuvering devices, and gyroscopic attitude control devices, as found in spacecraft assemblies. Where multiple RPBs 110 are included within spacecraft 120, they may also interface with one another to facilitate communication therebetween, as shown in FIG. 1.

As described above, functionality of RPB 110 is supported by a plurality of software modules 140 and firmware modules 142, stored within software and firmware library 103 for example, that are also pre-tested and 'flight ready'. These modules are selected for inclusion with one or more specific RPBs 110 of the satellite by mission design tools 102 based upon mission requirements 106, and specified within configuration 112. The use of RPB 110 and modules 140 and 142 reduces the required effort for integration and testing of satellite 120. Particularly, only modified and/or added functionality needs detailed integration and testing, together with interaction of utilized modules, within spacecraft 120.

Continuing with the example of FIG. 1, RPBs 110(1)-(3) are each configured by programmer 118 based upon configuration 112. For example, software modules 140 and/or firmware modules 142 are loaded into RPB 110 based upon required functionality, as part of the software payload. Integration and testing of spacecraft 120 is further facilitated by the ability to tune the flight software application suite utilizing data from robust simulation so that the task of finalizing the flight software may be accomplished in parallel with the assembly of the spacecraft. Thus, at a moment's notice, a new RPB 110 may be pulled off a shelf at an avionics depot, configured with applicable software, interfaced with a suite of end-item components, installed on a particular spacecraft, tested and fully integrated in a matter of hours, thus eliminating the months of development and integration time typical of the current art.

Figure 2:
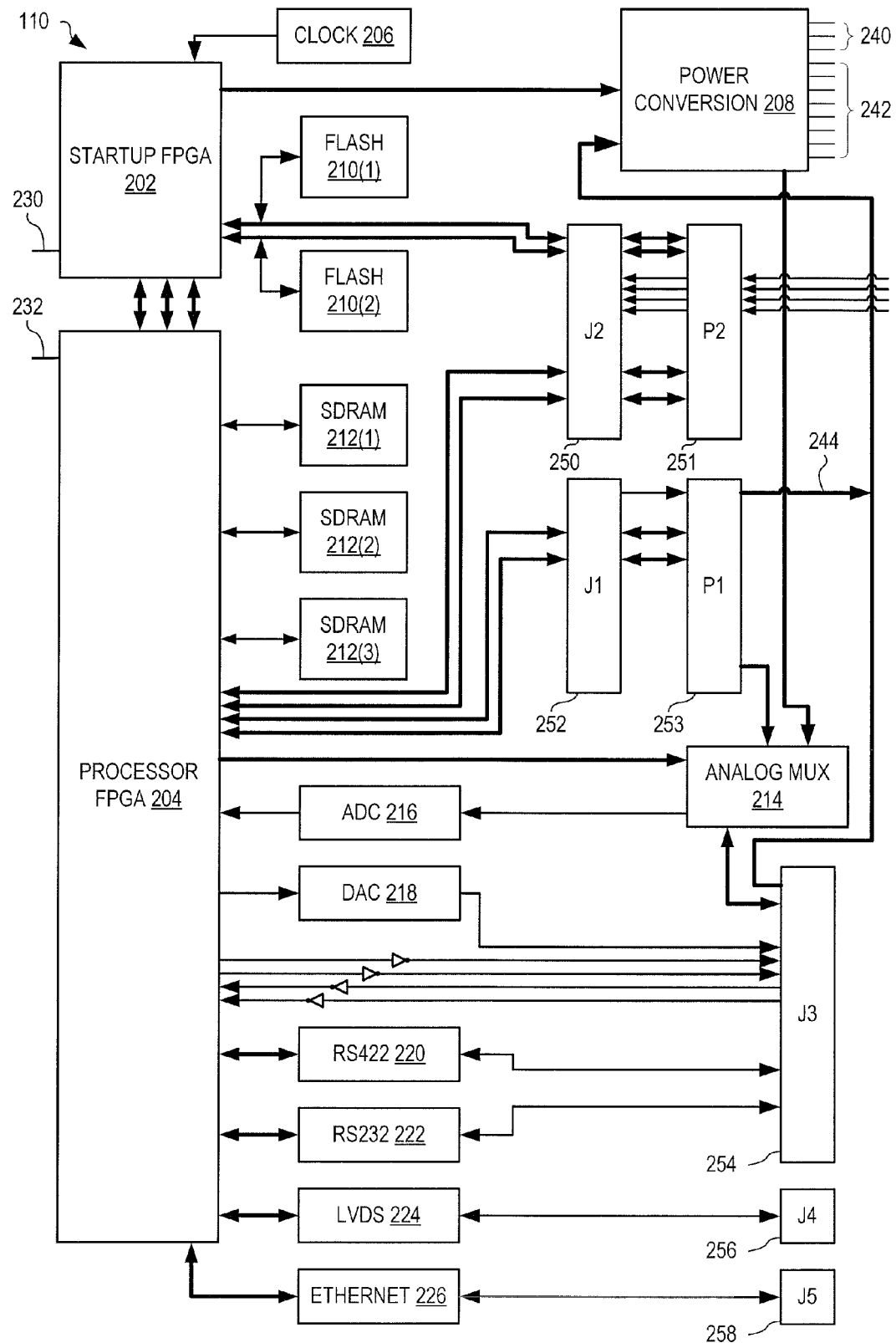
FIG. 2 shows one exemplary RPB of FIG. 1.

FIG. 2 shows exemplary detail of RPB 110. RPB 110 includes a startup one-time-programmable field programmable gate array (FPGA) 202 that is operable to load parameters stored within flash memories 210(1) and 210(2) and configure operation of other components of RPB 110. In particular, startup FPGA 202 copies configuration parameters from flash memories 210(1), 210(2) into the one or more processor FPGAs 204 provided on each RPB 110. RPB 110 also includes one or more processor FPGAs 204 (such as Virtex® from Xilinx®), each of which may include a soft processor unit that is configurable (e.g., by programmer 118 and/or via startup FPGA 202) to operate with a desired functionality for the intended use of RPB 110. In an alternate embodiment, processor FPGA 204 is augmented with a hard non-configurable processor module (and optionally a numeric coprocessor) where RPB 110 is intended to perform more calculation intensive work according to reconfigurable firmware stored in a memory on the board. FPGA 202 has a serial interface 230 that allows configuration and programming by programmer 118, for example. Similarly, processor FPGA 204 has a serial interface 232 that allows configuration and programming by programmer 118, for example. Serial interfaces 230 and 232 may provide Standard Test Access Port and Boundary-Scan Architecture, known in the art, such as Joint Test Action Group (JTAG) interface.

RPB 110 has at least one flash memory for storing configuration information, at least one synchronous dynamic random access memory (SDRAM) for storing executable software and data. In one embodiment, RPB 110 has three SDRAMs 210(1)-(3) to provide redundant, error corrected data storage. RPB 110 include analog signal handling in the form of an analog to digital converter (ADC) for converting an analog signal into a digital value, an analog multiplexer for connecting one of a plurality of analog signals to the ADC, and a digital to analog converter (DAC) for converting a digital value into an analog signal. RPB 110 has digital input/output functionality in the form of at least one digital input, and at least one digital output, each of which may include additional buffers and drivers to convert voltages of the digital signals into and from the voltage used by processor FPGA 204. To facilitate communication with other RPBs and end item components, RPB 110 also has a plurality of communication interfaces, such as (but not limited to) RS422, RS232, Spacewire, and Ethernet. Spacewire is a communication network commonly used within spacecraft for communication between functional units. RPB 110 also has a power converter for converting input power into one or more power sources to operate components (e.g., ADC, DAC, RS422 interface, RS232 interface, and Ethernet interface) of RPB 110 and to optionally provide power to one or more interfaced end item components and other RPBs.

The combination of functional components on RPB 110, and the flexibility of configuration of these components, allows the RPB to be used for multiple applications without re-design.

Figure 3:
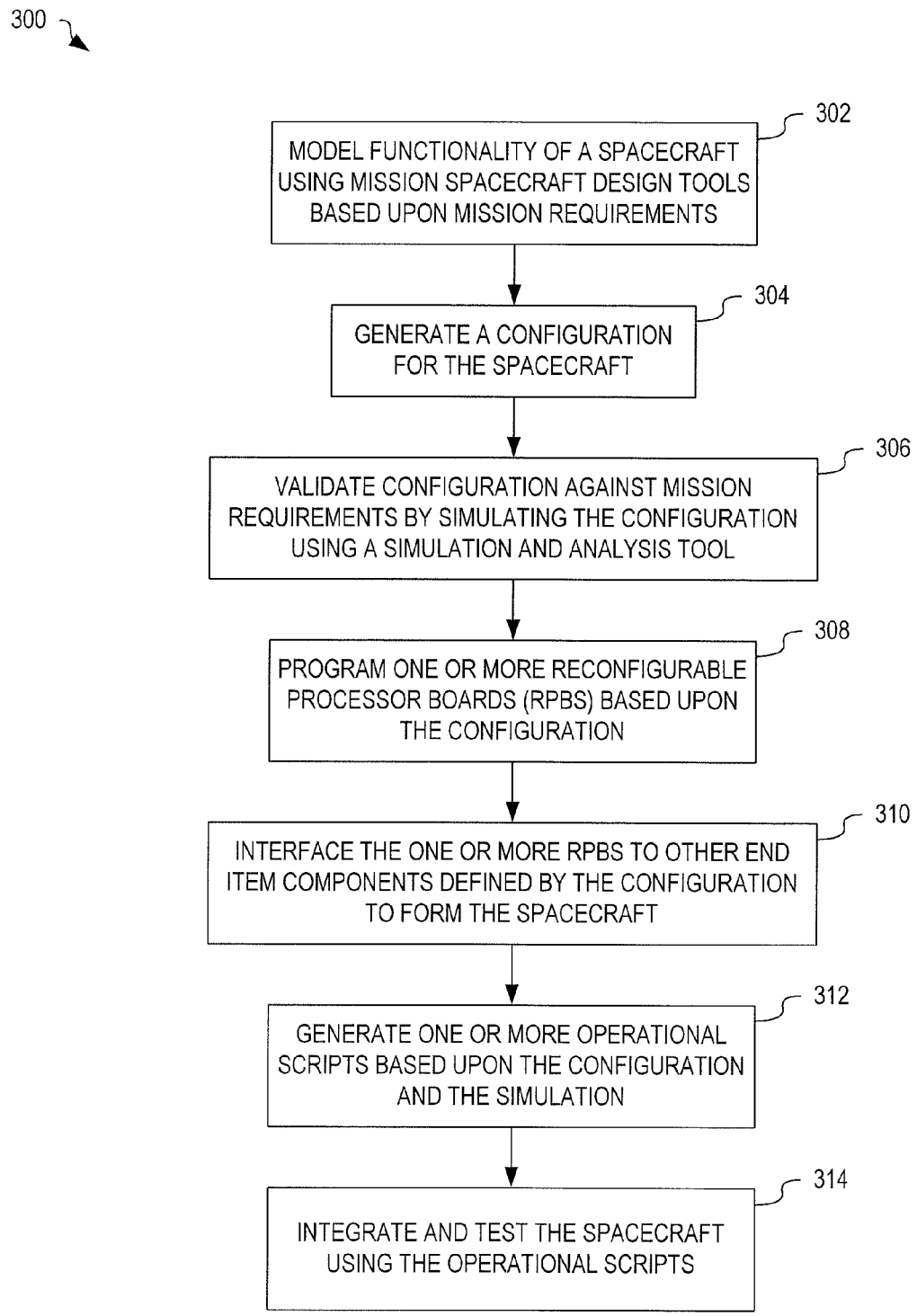
FIG. 3 is a flowchart illustrating one exemplary method for reducing development, integration and testing time of a spacecraft implemented with one or more RPBs of FIG. 2.

FIG. 3 is a flowchart illustrating one exemplary method 300 for reducing development, integration and testing time of a spacecraft implemented with one or more RPBs 110 of FIG. 2. In step 302, functionality of the spacecraft based upon mission requirements is entered into MSDT as a series of constraints. In one example of step 302, a user utilizes MSDT 102 to create a satellite model 104 based upon mission requirements 106. In step 304, a configuration for the spacecraft is generated. In one example of step 304, mission design tools 102 generate configuration 112 that defines configuration of one or more RPBs 110 and other end item components 122-132 of satellite 120. In step 306, the configuration is validated against mission requirements by simulating the configuration using a simulation and analysis tool. In one example of step 306, simulation and analysis tool 114 simulates and analyzes functionality of satellite 120 based upon configuration 112 to verify operation against mission requirements 106.

In step 308, one or more RPBs are programmed based upon the configuration. In one example of step 308, RPBs 110(1)-(3) are programmed (configured) by programmer 118 based upon configuration 112. In step 310, the one or more RPBs are interfaced to other end item components defined by the configuration to form the spacecraft. In one example of step 310, RPBs 110(1)-(3) are interfaces to each other, solar arrays 112, star tracker 124, radio 126, sun sensor 130, and other end item components 132 to form spacecraft 120.

In step 312, one or more operational scripts are generated based upon the configuration and the simulation. In one example of step 312, operational scripts 115 are generated by simulation and analysis tool 114 based upon configuration 112 and simulation thereof. In step 314, the spacecraft is integrated and tested using the operational scripts. In one example of step 314, spacecraft 120 is integrated and tested using operational scripts 115.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method for reducing development, integration and testing time of a spacecraft implemented with one or more reconfigurable processor boards (RPBs), comprising the steps of:
    modeling functionality of the spacecraft using mission design tools and based upon mission requirements;
    generating a configuration for the spacecraft;
    validating the configuration against mission requirements by simulating the configuration using a simulation and analysis tool;
    programming one or more RPBs based upon the configuration;
    interfacing the one or more RPBs to other end item components defined by the configuration to form the spacecraft;
    generating one or more operational scripts based upon the configuration and the simulation; and
    integrating and test the spacecraft using the operational scripts.

2. The method of claim 1, wherein the step of generating is performed concurrently with one or both of the steps of programming and interfacing.

* * * * *

UNITED STATES PATENT AND TRADEMARK OFFICE
CERTIFICATE OF CORRECTION

PATENT NO. : 8,478,571 B1  
APPLICATION NO. : 12/848060  
DATED : July 2, 2013  
INVENTOR(S) : Gerald B. Murphy et al.

It is certified that error appears in the above-identified patent and that said Letters Patent is hereby corrected as shown below:

In the Specifications

Column 1, lines 14-20, "This invention was made with Government support under the following Contract Nos. FA9453-05-D-250 0001, awarded by the U.S. Air Force, FA9453-04-C-0317 awarded by the U.S. Air Force, FA9453-07-M-0131 awarded by the U.S. Air Force, FA9453-08-C-0075 awarded by the U.S. Air Force, and FA9453-09-C-0312 awarded by the U.S. Air Force. The Government has certain rights in the invention."

should read --This invention was made with Government support under the following Contract Nos. FA9453-05-D-250 0001, awarded by the U.S. Air Force, FA9453-04-C-0317 awarded by the U.S. Air Force, FA9453-07-M-0131 awarded by the U.S. Air Force, FA9453-08-C-0075 awarded by the U.S. Air Force, FA9453-09-C-0312 awarded by the U.S. Air Force_and FA9453-06-C-0056 awarded by The Air Force Research Laboratory (AFRL). The Government has certain rights in the invention.--

Signed and Sealed this  
Fifteenth Day of April, 2014

Michelle K. Lee  
*Deputy Director of the United States Patent and Trademark Office*